(12) United States Patent
Fu et al.

(10) Patent No.: US 11,695,856 B2
(45) Date of Patent: Jul. 4, 2023

(54) SCHEDULING SOLUTION CONFIGURATION METHOD AND APPARATUS, COMPUTER READABLE STORAGE MEDIUM THEREOF, AND COMPUTER DEVICE

(71) Applicant: GUIZHOU BAISHANCLOUD TECHNOLOGY CO., LTD., Guiyang (CN)

(72) Inventors: Lijia Fu, Guiyang (CN); Hui Miao, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 162 days.

(21) Appl. No.: 16/634,838

(22) PCT Filed: Jul. 11, 2018

(86) PCT No.: PCT/CN2018/095222
§ 371 (c)(1),
(2) Date: Jan. 28, 2020

(87) PCT Pub. No.: WO2019/019915
PCT Pub. Date: Jan. 31, 2019

(65) Prior Publication Data
US 2021/0120097 A1    Apr. 22, 2021

(30) Foreign Application Priority Data

Jul. 28, 2017  (CN) .......................... 201710631021.7

(51) Int. Cl.
*H04L 67/61* (2022.01)
*H04L 41/0677* (2022.01)
(Continued)

(52) U.S. Cl.
CPC ............ *H04L 67/61* (2022.05); *G06F 9/4881* (2013.01); *G06F 9/5038* (2013.01);
(Continued)

(58) Field of Classification Search
CPC ............... H04L 67/322; H04L 41/0813; H04L 41/0823; H04L 41/0677; H04L 41/082;
(Continued)

(56) References Cited

U.S. PATENT DOCUMENTS 7,936,770 B1 * 5/2011 Frattura .............. H04L 47/6215
370/357
8,028,046 B2 * 9/2011 Elliott ................. H04L 61/1517
709/220
(Continued)

FOREIGN PATENT DOCUMENTS

| CN | 103516918 A | 1/2014 |
| CN | 103699440 A | 4/2014 |

(Continued)

OTHER PUBLICATIONS

World Intellectual Property Organization (WIPO) International Search Report and Written Opinion for PCT/CN2018/095222 dated Sep. 26, 2018 6 Pages.

(Continued)

*Primary Examiner* — Patrice L Winder
(74) *Attorney, Agent, or Firm* — Anova Law Group, PLLC

(57) ABSTRACT

A scheduling scheme configuration method includes performing state verification on a plurality of operation dimensions involved in generating a scheduling scheme, and, in response to one or more of the operation dimensions being abnormal, removing the one or more abnormal operation dimensions to generate a new scheduling scheme.

17 Claims, 3 Drawing Sheets

(51) Int. Cl.
  *H04L 41/082* (2022.01)
  *H04L 41/0823* (2022.01)
  *H04L 41/0813* (2022.01)
  *G06F 9/50* (2006.01)
  *G06F 9/48* (2006.01)
  *G06F 11/14* (2006.01)

(52) U.S. Cl.
  CPC ........ *H04L 41/0677* (2013.01); *H04L 41/082* (2013.01); *H04L 41/0813* (2013.01); *H04L 41/0823* (2013.01); *G06F 11/142* (2013.01); *G06F 11/143* (2013.01)

(58) Field of Classification Search
  CPC ..... H04L 67/61; H04L 43/16; H04L 41/0816; H04L 41/0866; H04L 41/0803; H04L 45/28; H04L 47/6215; H04L 47/58; H04L 47/623; G06F 9/4881; G06F 9/5038; G06F 11/142; G06F 11/143
  See application file for complete search history.

(56) References Cited

U.S. PATENT DOCUMENTS

| | | | | |
|---|---|---|---|---|
| 8,863,137 | B2* | 10/2014 | Keller | G06F 9/5038 718/104 |
| 9,491,054 | B2* | 11/2016 | Zhang | H04L 41/0893 |
| 9,535,754 | B1* | 1/2017 | Suarez | G06F 9/5011 |
| 10,721,123 | B2* | 7/2020 | Lin | H04L 41/0869 |
| 10,819,575 | B2* | 10/2020 | Kohli | H04L 41/0806 |
| 11,051,320 | B1* | 6/2021 | Siraj | H04L 47/2475 |
| 2003/0051026 | A1 | 3/2003 | Carter et al. | |
| 2007/0268514 | A1* | 11/2007 | Zeldin | H04L 41/0893 358/1.15 |
| 2009/0171732 | A1* | 7/2009 | Bobak | G06F 11/1402 705/7.13 |
| 2009/0172670 | A1* | 7/2009 | Bobak | G06Q 10/06 718/100 |
| 2009/0248996 | A1 | 10/2009 | Mandyam et al. | |
| 2012/0131376 | A1 | 5/2012 | Khawer et al. | |
| 2015/0248231 | A1 | 9/2015 | Mandyam et al. | |
| 2016/0050116 | A1* | 2/2016 | Sheshadri | H04L 67/125 709/221 |
| 2016/0352528 | A1* | 12/2016 | Law | H04L 47/2475 |
| 2017/0126492 | A1* | 5/2017 | Law | H04L 41/0806 |
| 2017/0163485 | A1* | 6/2017 | Rokui | H04L 41/08 |
| 2018/0295019 | A1* | 10/2018 | Magnusson | H04L 41/0886 |
| 2019/0089594 | A1* | 3/2019 | Jubran | H04L 41/0866 |

FOREIGN PATENT DOCUMENTS

| | | |
|---|---|---|
| CN | 103763209 A | 4/2014 |
| CN | 105306576 A | 2/2016 |
| CN | 105634992 A | 6/2016 |
| CN | 105897933 A | 8/2016 |
| CN | 106130786 A | 11/2016 |
| CN | 106487598 A | 3/2017 |
| CN | 106570727 A | 4/2017 |
| CN | 103699440 B | 5/2017 |
| CN | 106790482 A | 5/2017 |
| CN | 107733681 A | 2/2018 |
| JP | 2013059035 A | 3/2013 |

OTHER PUBLICATIONS

Intellectual Property India Examination Report for Application No. 202027003308 dated Mar. 2, 2021 5 pages.

* cited by examiner

SCHEDULING SOLUTION CONFIGURATION METHOD AND APPARATUS, COMPUTER READABLE STORAGE MEDIUM THEREOF, AND COMPUTER DEVICE

CROSS-REFERENCE TO RELATED APPLICATIONS

The present application is a national stage entry under 35 U.S.C. § 371 of International Application No. PCT/CN2018/095222, filed on Jul. 11, 2018, which claims priority to Chinese Patent Application No. 201710631021.7 filed to the SIPO on Jul. 28, 2017 and entitled "SCHEDULING SCHEME CONFIGURATION METHOD AND APPARATUS", the contents of both of which are incorporated herein by reference in their entireties.

The present application claims priority to Chinese Patent Application No. 201710631021.7 filed to the SIPO on Jul. 28, 2017 and entitled "SCHEDULING SCHEME CONFIGURATION METHOD AND APPARATUS", the content of which is incorporated herein by reference in its entirety.

TECHNICAL FIELD

The embodiments of the present invention relate to, but are not limited to, the field of computer networks, and in particular to a method and apparatus for configuring a scheduling scheme of access resources, a computer readable storage medium thereof and a computer device thereof.

BACKGROUND

With the development of the Internet, users have higher and higher requirements for the quality of service of network access. Intelligent scheduling systems are widely used in various network systems to improve the access efficiency and enhance the system robustness. As a result, the reference conditions and intelligent algorithms for intelligent traffic scheduling become more complex, and the maintenance cost becomes higher.

The development process of intelligent scheduling can be divided into geographic location and availability based scheduling, quality-of-service based scheduling, optimal cost performance based scheduling or the like, including IP positioning operations, availability calculations, quality-of-service operations, bandwidth cost calculations or the like. Once a certain operation basic data or operation logic fails, the operation of the whole scheduling system will be affected, and the network access throughout the network will be further affected.

SUMMARY

The embodiments of the present invention are aimed at solving the problems described above.

In accordance with a first aspect of the embodiments of the present invention, a scheduling scheme configuration method is provided, including:

performing state verification on each operation dimension involved in the generation of a scheduling scheme; and when one or more operation dimensions are abnormal, removing the abnormal operation dimensions to generate a new scheduling scheme.

Preferably, the method further includes:

configuring multiple operation modes, operation dimensions included in each operation mode being different, the multiple operation modes including a standard operation mode including all operation dimensions and at least one degraded operation mode including some of the operation dimensions.

Preferably, the step of, when one or more operation dimensions are abnormal, removing the abnormal operation dimensions to generate a new scheduling scheme includes:

removing, from the standard operation mode, the abnormal operation dimensions to obtain a new operation mode; or, selecting, from the multiple operation modes, a degraded operation mode not including the abnormal operation dimensions as an operation mode for further use in the calculation of a scheduling scheme.

Preferably, the multiple operation modes have different weight values, and a degraded operation mode with a higher weight value is preferentially selected when a degraded operation mode not including the abnormal operation dimensions is selected from the multiple operation modes.

Preferably, operation dimensions in each operation mode are sorted in a certain order; an output of the operation dimension sorted at the previous position is used as an input of the current operation dimension, an output of the current operation dimension is used as an input of the operation dimension sorted at the next position, and an initial scheduling scheme is used as an input of the operation dimension sorted at the first position; and, the data format of the input scheduling scheme of each operation dimension is consistent with the data format of the output scheduling scheme.

Preferably, the step of performing state verification on each operation dimension involved in the generation of a scheduling scheme includes:

verifying whether the scheduling scheme output after the operation of each operation dimension is abnormal; and verifying the timeliness of basic data of each operation dimension, and determining the corresponding operation dimension is abnormal when the timeliness of the basic data exceeds a corresponding failure threshold.

Preferably, the step of verifying whether the scheduling scheme output after the operation of each operation dimension is abnormal includes:

by using the initial scheduling scheme as the input of the operation dimension sorted at the first position and according to the sorting of operation dimensions in the currently used operation mode, sequentially operating the input scheduling scheme to obtain an output scheduling scheme;

comparing the output scheduling scheme with the input scheduling scheme of the same operation dimension; and when the rate of change of the output scheduling scheme relative to the input scheduling scheme of the same operation dimension exceeds a preset abnormality threshold, determining that the operation dimension is abnormal.

Preferably, after it is determined that an operation dimension is abnormal, the input scheduling scheme of the operation dimension is directly transparently transmitted to an operation dimension sorted at a position next to the operation dimension, as an input scheduling scheme of the operation dimension at the next position.

Preferably, when the currently used operation mode is a degraded operation mode, the method further includes:

performing state verification on each operation dimension in the standard operation mode; and switching back to the standard operation mode when each operation dimension in the standard operation mode is normal.

In accordance with another aspect of the embodiments of the present invention, a scheduling scheme configuration apparatus is provided, including:

an abnormality detection module configured to perform state verification on each operation dimension involved in the generation of a scheduling scheme; and a scheme configuration module configured to, when one or more operation dimensions are abnormal, remove the abnormal operation dimensions to generate a new scheduling scheme.

Preferably, the apparatus further includes:

an operation mode management module configured to configure multiple operation modes, operation dimensions included in each operation mode being different, the multiple operation modes including a standard operation mode including all operation dimensions and at least one degraded operation mode including some of the operation dimensions.

Preferably, the scheme configuration module includes:

a first configuration unit configured to remove, from the standard operation mode, the abnormal operation dimensions to obtain a new operation mode; and a second configuration unit configured to select, from the multiple operation modes, a degraded operation mode not including the abnormal operation dimensions as an operation mode for further use in the calculation of a scheduling scheme.

Preferably, the multiple operation modes have different weight values, and the second configuration unit is specifically configured to preferentially select a degraded operation mode with a higher weight value when a degraded operation mode not including the abnormal operation dimensions is selected from the multiple operation modes.

Preferably, operation dimensions in each operation mode are sorted in a certain order; an output of the operation dimension sorted at the previous position is used as an input of the current operation dimension, an output of the current operation dimension is used as an input of the operation dimension sorted at the next position, and an initial scheduling scheme is used as an input of the operation dimension sorted at the first position; the data format of the input scheduling scheme of each operation dimension is consistent with the data format of the output scheduling scheme; and, the abnormality detection module includes:

a logic verification unit configured to verify whether a scheduling scheme output after the operation of each operation dimension is abnormal; and a data verification unit configured to verify the timeliness of basic data of each operation dimension, and determine the corresponding operation dimension is abnormal when the timeliness of the basic data exceeds a corresponding failure threshold.

Preferably, the logic verification unit includes:

an operation subunit configured to, by using the initial scheduling scheme as the input of the operation dimension sorted at the first position and according to the sorting of operation dimensions in the currently used operation mode, sequentially operate the input scheduling scheme to obtain an output scheduling scheme;

a comparison subunit configured to compare the output scheduling scheme with the input scheduling scheme of the same operation dimension; and a logic abnormality detection subunit configured to determine that the operation dimension is abnormal, when the rate of change of the output scheduling scheme relative to the input scheduling scheme of the same operation dimension exceeds a preset abnormality threshold.

Preferably, the operation subunit is further configured to, after it is determined that an operation dimension is abnormal, directly transparently transmit the input scheduling scheme of the operation dimension to an operation dimension sorted at a position next to the operation dimension, as an input scheduling scheme of the operation dimension at the next position.

Preferably, the abnormality detection module further includes a standard mode detection unit, and the scheme configuration module further includes a third configuration unit;

the standard mode detection unit is configured to perform state verification on each operation dimension in the standard operation mode when the currently used operation mode is a degraded operation mode; and the third configuration unit is configured to switch back to the standard operation mode when each operation dimension in the standard operation mode is normal.

Another aspect of the embodiments of the present invention provides a computer readable storage medium storing computer programs that, when executed by a processor, implement the steps of the method described above.

Another aspect of the embodiments of the present invention provides a computer device, including a memory, a processor and computer programs that are stored on the memory and runnable on the processor, the processor implementing the steps of the method described above when executing the programs.

The embodiments of the present invention provide a scheduling scheme configuration method and apparatus, in which state verification is performed on operation dimensions involved in the generation of a scheduling scheme; and when one or more operation dimensions are abnormal, the abnormal operation dimensions are removed to generate a new scheduling scheme. The discovery and automatic correction of an abnormal operation mode are realized, the normal generation of a scheduling scheme is ensured, and reliable network services are thus ensured. In accordance with the difference comparison of the coverage scheme and the network area-service node mapping table before and after operation and the timeliness of basic data, the automatic detection of the basic data and operation logic of the scheduling operation module is realized; a scheme of controlling the scheduling operation module based on the operation mode is provided; and, a hierarchical scheduling operation system is realized, and the fast isolation of a fault is realized.

Other characteristics, features and advantages of the embodiments of the present invention will become apparent upon reading the following description of exemplary embodiments with reference to the accompanying drawings.

BRIEF DESCRIPTION OF THE DRAWINGS

The drawings incorporated into this specification and constituting a part of this specification show the embodiments of the present invention, and are used together with the description to explain the principles of the embodiments of the present invention. Throughout the drawings, similar reference numerals represent similar elements. The drawings to be described hereinafter are some but not all of the embodiments of the present invention. A person of ordinary skill in the art may obtain other drawings according to these drawings without paying any creative effort.

DETAILED DESCRIPTION OF THE EMBODIMENTS

To make the objectives, technical solutions and advantages of the embodiments of the present invention clearer, the technical solutions in the embodiments of the present invention will be described clearly and completely with reference to the drawings in the embodiments of the present invention. Apparently, the described embodiments are some but not all of the embodiments of the present invention. All other embodiments obtained by a person of ordinary skill in the art based on the embodiments of the present invention without paying any creative effort shall fall into the protection scope of the embodiments of the present invention. It is to be noted that the embodiments in the present application and the features in the embodiments can be combined in any way if not conflicted.

An existing scheduling scheme generation mechanism includes multiple operation links. Once a certain operation basic datum or operation logic fails, the running of the whole scheduling system will be affected, and the network access throughout the network will be further affected. At present, there is yet no method to discover a fault of the basic data and the operation logic of the scheduling operation module, and the system cannot automatically and quickly perform fault processing on the scheduling operation module with one or more faults in the case of fault occurrence, resulting in a serious delay in the fault discovery and processing, affecting the normal operation of the system and reducing the service efficiency and quality of service of the system.

In order to solve the above problems, the embodiments of the present invention provide a scheduling scheme configuration method and apparatus. Abnormality detection can be performed on operation dimensions involved in a scheduling scheme to timely discover abnormal logic and abnormal basic data, and the abnormal operation dimensions can be automatically eliminated, and a guaranteed operation scheme can be generated when the abnormality is not eliminated, to ensure the continuous and normal operation of services.

Embodiment 1 of the present invention will be described below with reference to the accompanying drawings.

Figure 1:
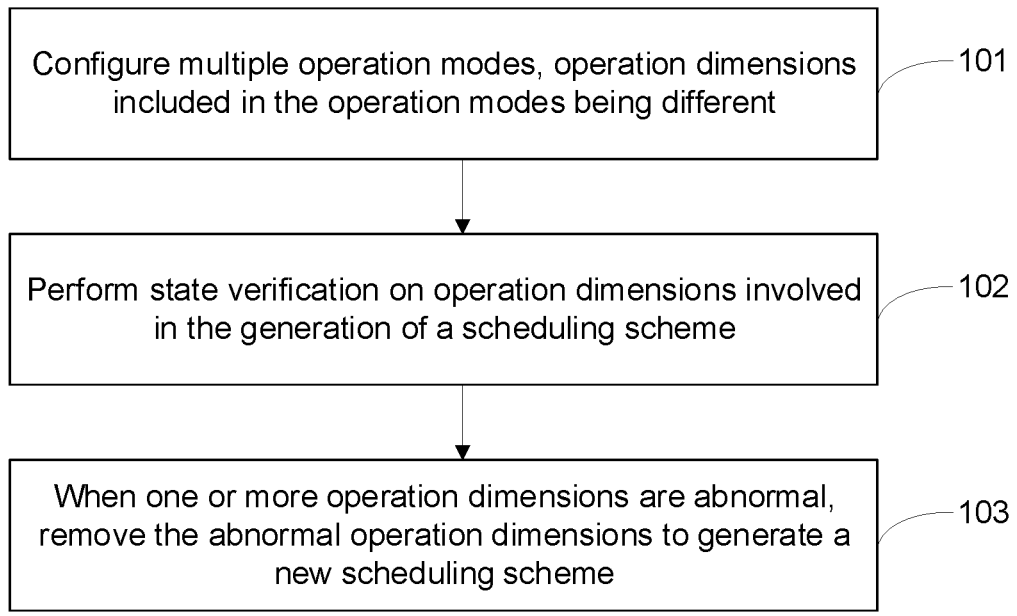
FIG. 1 exemplarily shows a flow of a scheduling scheme configuration method according to Embodiment 1 of the present invention.

This embodiment of the present invention provides a scheduling scheme configuration method. The flow of configuring and adjusting a scheduling scheme by this method is shown in FIG. 1, including the following.

Step 101: Multiple operation modes are configured, operation dimensions included in each operation mode being different.

In this step, multiple operation modes used for generating a scheduling scheme are pre-configured. The multiple operation modes include a standard operation mode including all operation dimensions and at least one degraded operation mode including some of the operation dimensions.

Each operation dimension can be realized by a separate operation module.

Operation dimensions in each operation mode are sorted in a certain order. An output of the operation dimension sorted at the previous position is used as an input of the current operation dimension, an output of the current operation dimension is used as an input of the operation dimension sorted at the next position, and an initial scheduling scheme is used as an input of the operation dimension sorted at the first position. The data format of the input scheduling scheme of each operation dimension is consistent with the data format of the output scheduling scheme.

The operation dimensions involved in this embodiment of the present invention include, but not limited to, the following:

IP positioning operation, availability operation, quality-of-service operation and cost operation.

Step 102: State verification is performed on each operation dimension involved in the generation of a scheduling scheme.

In this step, regardless of operation dimensions forming the currently used operation mode, it is necessary to perform state verification on the currently used scheduling scheme operation mode to determine whether the state of each operation dimension is abnormal, so as to timely discover abnormal operation dimensions.

In this embodiment of the present invention, the verification involved includes the following two aspects.

1. Verification of the operation logic: it is verified whether a scheduling scheme output after the operation of each operation dimension is abnormal.

Specifically, by using the initial scheduling scheme as the input of the operation dimension sorted at the first position and according to the sorting of operation dimensions in the currently used operation mode, the input scheduling scheme is sequentially operated to obtain an output scheduling scheme.

The output scheduling scheme is compared with the input scheduling scheme of the same operation dimension.

When the rate of change of the output scheduling scheme relative to the input scheduling scheme of the same operation dimension exceeds a preset abnormality threshold, it is determined that the operation dimension is abnormal.

2. Verification of the basic data: the timeliness of basic data of each operation dimension is verified, and it is determined that the corresponding operation dimension is abnormal when the timeliness of the basic data exceeds a corresponding failure threshold.

By taking the example of the operation dimensions in the step 101 as an example, the basic data involved in each operation dimensional is derived from the following:

the basic data corresponding to the IP positioning operation is an IP library, the basic data is derived from operation and maintenance configuration; the basic data of the availability operation is monitored data, the basic data is acquired from a database of a monitoring system; the basic data of the quality-of-service operation is quality-of-service data, the basic data is acquired from a big data platform; and, the basic data of the cost operation is acquired by a configuration management system and a big data system.

No matter whether a standard operation mode or a degraded operation mode runs currently or whether an operation mode including all operation dimensions or an operation mode including some of the operation dimensions runs currently, it is possible to perform state verification on the currently used operation mode by this step, to determine whether the currently used operation mode is normal.

After it is determined that an operation dimension is abnormal, the input scheduling scheme of the operation dimension is directly transparently transmitted to an operation dimension sorted at a position next to the operation dimension, as an input scheduling scheme of the operation dimension at the next position.

Step 103: When one or more operation dimensions are abnormal, the abnormal operation dimensions are removed to generate a new scheduling scheme.

In this step, the abnormal operation dimensions can be directly removed from the standard operation mode to obtain a new operation mode, in which the sorting relationship is still reserved.

In a case where multiple different operation modes are pre-configured, it is also possible to select, from the multiple operation modes, a degraded operation mode not including the abnormal operation dimensions as an operation mode for further use in the calculation of the scheduling scheme.

Further, the multiple operation modes may have different weight values, and a degraded operation mode with a higher weight value is preferentially selected when a degraded operation mode not including the abnormal operation dimensions is selected from the multiple operation modes.

For example:

standard operation mode:

IP positioning operation→availability operation→quality-of-service operation→cost operation, with a weight value of 100;

degraded operation mode 1: IP positioning operation-→availability operation→quality-of-service operation, with a weight value of 90;

degraded operation mode 2: IP positioning operation-→availability operation, with a weight value of 80; and degraded operation mode 3: IP positioning operation, with a weight value of 70.

In the above example, the operation dimension "IP positioning operation" is a necessary operation dimension, i.e., the most basic operation dimension. The specific necessary operation dimension can be configured according to the system requirements, and can include multiple operation dimensions. An operation mode only including the set of necessary operation dimensions is the last guarantee for the continuous generation of the scheduling scheme.

As to the detected abnormal operation dimensions, it is possible to record the abnormal operation dimensions or send an alarm message. Preferably, when a necessary operation dimension is abnormal, it is necessary to give a higher-level alarm.

Embodiment 2 of the present invention will be described below with reference to the accompanying drawings.

Figure 2:
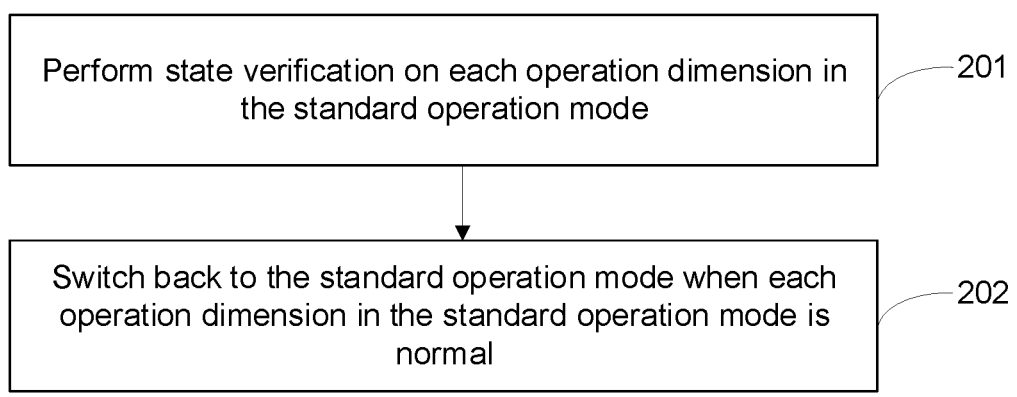
FIG. 2 exemplarily shows a flow of the scheduling scheme configuration method according to Embodiment 2 of the present invention.

Embodiment 1 of the present invention provides a scheduling scheme configuration method, which can perform state verification on the currently used operation mode, and remove the abnormal operation dimension when an operation dimension is abnormal, so as to ensure the normal generation of the scheduling scheme. In a case where the abnormal operation dimensions are removed and a scheduling scheme is continuously generated, except that the verification is continuously performed on the currently used operation mode including some of the operation dimensions, in order to detect the recovery of the abnormal operation dimensions as soon as possible and use a standard operation mode with the best performance as early as possible, this embodiment of the present invention provides another scheduling scheme configuration method, which performs continuous verification on the availability of the standard operation mode and is performed in parallel with the technical solutions provided in Embodiment 1 of the present invention. The specific flow is shown in FIG. 2 and includes the following.

Step 201: State verification is performed on each operation dimension in the standard operation mode.

In this step, when the currently used operation mode is a degraded operation mode or an operation mode including some of the operation dimensions, the state verification of the recovery of the standard operation mode can be started.

The verification process involved in this embodiment of the present invention may be triggered by an external instruction or may be performed periodically.

Step 202: The standard operation mode is switched back to when each operation dimension in the standard operation mode is normal.

In this step, when all the operation dimensions are normal, it is determined that the standard operation mode is available, and the standard operation mode is switched back, to continuously provide a mode of generating a scheduling scheme with the best performance.

Embodiment 3 of the present invention will be described below with reference to the accompanying drawings.

Figure 3:
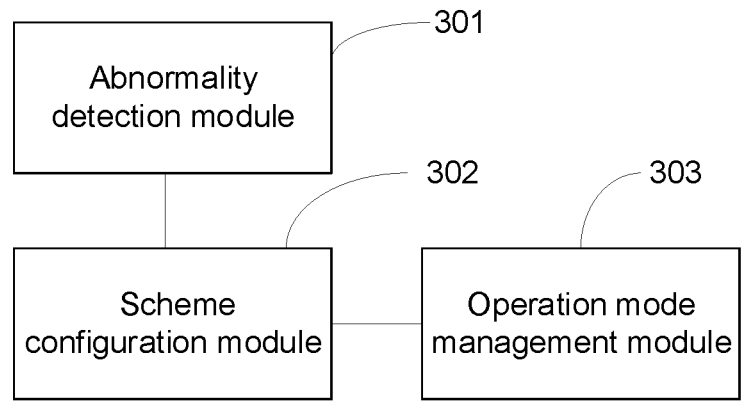
FIG. 3 exemplarily shows an architecture of a scheduling scheme configuration system according to Embodiment 3 of the present invention.

This embodiment of the present invention provides a scheduling scheme configuration apparatus. The structure of the apparatus is shown in FIG. 3, including:

an abnormality detection module 301 configured to perform state verification on each operation dimension involved in the generation of a scheduling scheme; and a scheme configuration module 302 configured to, when one or more operation dimensions are abnormal, remove the abnormal operation dimensions to generate a new scheduling scheme.

Preferably, the apparatus further includes:

an operation mode management module 303 configured to configure multiple operation modes, operation dimensions included in each operation mode being different, the multiple operation modes including a standard operation mode including all operation dimensions and at least one degraded operation mode including some of the operation dimensions.

Figure 4:
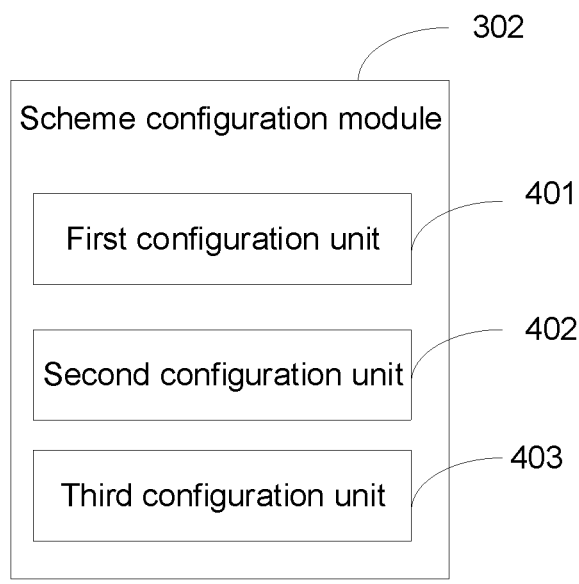
FIG. 4 exemplarily shows a structure of a scheme configuration module 302 in FIG. 3.

Preferably, the structure of the scheme configuration module 302 is shown in FIG. 4, including:

a first configuration unit 401 configured to remove, from the standard operation mode, the abnormal operation dimensions to obtain a new operation mode; and a second configuration unit 402 configured to select, from the multiple operation modes, a degraded operation mode not including the abnormal operation dimensions as an operation mode for further use in the calculation of a scheduling scheme.

Preferably, the multiple operation modes have different weight values, and the second configuration unit 402 is specifically configured to preferentially select a degraded operation mode with a higher weight value when a degraded operation mode not including the abnormal operation dimensions is selected from the multiple operation modes.

Figure 5:
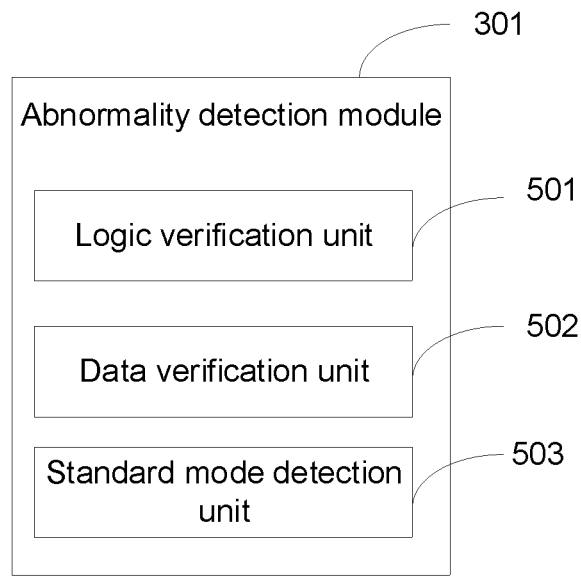
FIG. 5 exemplarily shows a structure of an abnormality detection module 301 in FIG. 3.

Preferably, operation dimensions in each operation mode are sorted in a certain order; an output of the operation dimension sorted at the previous position is used as an input of the current operation dimension, an output of the current operation dimension is used as an input of the operation dimension sorted at the next position, and an initial scheduling scheme is used as an input of the operation dimension sorted at the first position; the data format of the input scheduling scheme of each operation dimension is consistent with the data format of the output scheduling scheme; and, the structure of the abnormality detection module 301 is shown in FIG. 5, including:

a logic verification unit 501 configured to verify whether a scheduling scheme output after the operation of each operation dimension is abnormal; and a data verification unit 502 configured to verify the timeliness of basic data of each operation dimension, and determine the corresponding operation dimension is abnormal when the timeliness of the basic data exceeds a corresponding failure threshold.

Figure 6:
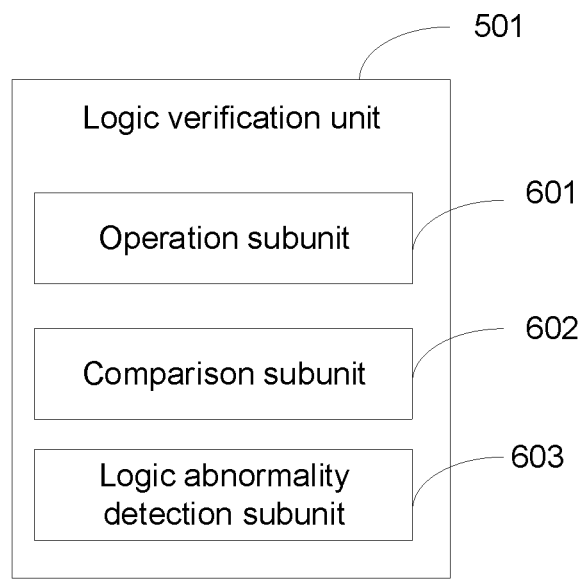
FIG. 6 exemplarily shows a structure of a logic verification unit 501 in FIG. 5.

Preferably, the structure of the logic verification unit 501 is shown in FIG. 6, including:

an operation subunit 601 configured to, by using the initial scheduling scheme as the input of the operation dimension sorted at the first position and according to the sorting of operation dimensions in the currently used operation mode, sequentially operate the input scheduling scheme to obtain an output scheduling scheme;

a comparison subunit 602 configured to compare the output scheduling scheme with the input scheduling scheme of the same operation dimension; and a logic abnormality detection subunit 603 configured to determine that the operation dimension is abnormal, when the rate of change of the output scheduling scheme relative to the input scheduling scheme of the same operation dimension exceeds a preset abnormality threshold.

Preferably, the operation subunit 601 is further configured to, after it is determined that an operation dimension is abnormal, directly transparently transmit the input scheduling scheme of the operation dimension to an operation dimension sorted at a position next to the operation dimension, as an input scheduling scheme of the operation dimension at the next position.

Preferably, the abnormality detection module 301 further includes a standard mode detection unit 503, and the scheme configuration module 302 further includes a third configuration unit 403;

the standard mode detection unit 503 is configured to perform state verification on each operation dimension in the standard operation mode when the currently used operation mode is a degraded operation mode; and the third configuration unit 403 is configured to switch back to the standard operation mode when each operation dimension in the standard operation mode is normal.

Embodiment 4 of the present invention will be described below with reference to the accompanying drawings.

This embodiment of the present invention provides a scheduling scheme configuration method. During the scheduling system coverage scheme operation, it is determined whether the basic data and operation logic of each operation module (which corresponds to an operation dimension and is a specific implementation of the function of the operation dimension) are abnormal, and the operation mode is modified as a type not including the abnormal operation module for scheduling operation if the basic data and operation logic are abnormal, so that the purpose of automatic abnormality discovery and automatic fault isolation is achieved.

The service process is as follows.

1. During the scheduling system coverage scheme operation, it is determined whether the basic data and operation logic of each operation module are abnormal 1) According to the sequential order of operation modules specified by a default operation mode, tasks of the operation modules are sequentially executed. The method to process the operation modules is to acquire an original coverage scheme and an original network area-service node mapping table and calculate a new coverage scheme and a new network area-service node mapping table by using the basic data and operation logic of the operation modules.

Operation mode: each operation mode corresponds to an ordered list of operation modules, and indicates a desired sequential order in which operation modules are executed. Multiple operation modes can be configured to form an operation mode list, and a different weight is set for each operation mode. The default operation mode is a standard operation mode.

Example of the operation mode list:

| | | | | | |
|---|---|---|---|---|---|
| Mode 1 (standard operation mode) | IP positioning operation module | Availability operation module | Quality-of-service operation module | Cost operation module | Weight value: 100 |
| Mode 2 (degraded operation mode) | IP positioning operation module | Availability operation module | Quality-of-service operation module | — | Weight value: 90 |
| Mode 3 (degraded operation mode) | IP positioning operation module | Availability operation module | — | — | Weight value: 80 |
| Mode 4 (degraded operation mode) | IP positioning operation module | — | — | — | Weight value: 70 |

A. The selection of each mode in the operation mode list follows the mutual exclusion principle, that is, when all the operation modules that are not in a certain operation mode are failed, the operation of the operation modules in this operation mode will not be affected. Consequently, the operation modules of each mode are prevented from affecting each other during a fault, and the operation modules are decoupled.

B. The method for controlling operation modules is to use each operation module as a standard micro-service. The input and output files of each operation module are the same in type and format and the calling interfaces of the operation modules are the same, so different operation modules can be freely combined for calculating the scheduling coverage scheme. The output of the operation module at the previous position can be used as the input of the operation module at the next position.

2) The method for determining whether the new coverage scheme and the new network area-service node mapping table are abnormal is as follows.

A. Determination of the operation logic: the rate of change of the new coverage scheme and the new network area-service node mapping table relative to the original versions is determined, and it is considered that the new coverage scheme and the new network area-service node mapping table are abnormal if the rate of change exceeds a specified threshold.

B. Determination of the basic data: the timeliness of the basic data of each operation module is determined, and it is considered that the basic data is abnormal if the timeliness exceeds a specified threshold.

3) If it is abnormal, the attribute of the operation module is identified as abnormal, and the new coverage scheme and the new network area-service node mapping table are used as an original coverage scheme and an original network area-service node mapping table of the next operation module in the sequential order of operation modules specified by the default operation mode, and the above processing and determination are continuously performed on the operation modules till to the last operation module. The new coverage scheme is used as a coverage scheme to be issued. That is, the data obtained by correcting the abnormal operation module will not be used by the operation module at the next position, and the input of the abnormal operation module is directly transparently transmitted to the operation module at the next position. 2. Confirmation and modification of the operation mode:

1) The attribute of each operation module is acquired.

2) If the attributes of all operation modules are normal, the current operation mode is maintained, and the coverage scheme to be issued is transmitted to a scheduling module for configuration file updating, so as to adjust the scheduling strategy.

3) If the attributes of one or more operation modules are abnormal, an operation mode not including any operation module with the abnormal attribute and having the highest weight is used as the currently-used degraded operation mode. In the normal case, the degraded operation mode is null. When the degraded operation mode is not null, the operation of the coverage scheme is executed preferentially according to the degraded operation mode.

3. The specified operation module is used according to the degraded operation mode to perform scheduling system coverage scheme operation, and it is evaluated whether the operation module specified by the standard mode returns to normal.

1) Scheduling system coverage scheme operation is performed according to the new operation mode, and the coverage scheme is issued to the scheduling module for configuration file updating so as to adjust the scheduling strategy.

2) The standard module is performed synchronously to perform scheduling system coverage scheme operation. If the attributes of all the operation modules are normal, the degraded operation mode is cleared, and the standard mode operation is recovered.

An embodiment of the present invention further provides a computer readable storage medium storing computer programs that, when executed by a processor, implement the steps of the method described above.

An embodiment of the present invention further provides a computer device, including a memory, a processor and computer programs that are stored on the memory and runnable on the processor, the processor implementing the steps of the method described above when executing the programs.

An embodiment of the present invention provides a scheduling scheme configuration apparatus, which can be combined with the scheduling scheme configuration method provided by the embodiments of the present invention to divide the basic specific operation links of an operation mode into multiple operation dimensions, perform state verification on operation dimensions involved in the generation of a scheduling scheme, and remove the abnormal operation dimensions to generate a new scheduling scheme when one or more operation dimensions are abnormal. The discovery and automatic correction of an abnormal operation mode are realized, the normal generation of a scheduling scheme is ensured, and reliable network services are thus ensured. In accordance with the difference comparison of the coverage scheme and the network area-service node mapping table before and after operation and the timeliness of basic data, the automatic detection of the basic data and the operation logic of the scheduling operation module is realized; a scheme of controlling the scheduling operation module based on the operation mode is provided; and, a hierarchical scheduling operation system is realized, and the fast isolation of a fault is realized.

The contents described above can be implemented independently or jointly in various ways, and these variants shall fall into the protection scope of the embodiments of the present invention.

Finally, it is to be noted that the foregoing embodiments are merely used for describing the technical solutions of the embodiments of the present invention, rather than limiting the technical solutions of the embodiments of the present invention. Although the present invention has been described in detail by the foregoing embodiments, it should be understood that a person of ordinary skill in the art can make modifications to the technical solutions recorded in the foregoing embodiments or equivalent replacements to some of the technical features, and these modifications or replacements shall not make the essence of the corresponding technical solutions depart from the spirit and scope of the technical solutions in the embodiments of the present invention.

INDUSTRIAL APPLICABILITY

The embodiments of the present invention provide a scheduling scheme configuration apparatus, which realizes the discovery and automatic correction of an abnormal operation mode, ensures the normal generation of a scheduling scheme and thus ensures reliable network services. Moreover, in accordance with the difference comparison of the coverage scheme and the network area-service node mapping table before and after operation and the timeliness of basic data, the automatic detection of the basic data and operation logic of the scheduling operation module is realized; a scheme of controlling the scheduling operation module based on the operation mode is provided; and, a hierarchical scheduling operation system is realized, and the fast isolation of a fault is realized.

The invention claimed is:

1. A method for configuring a scheduling scheme of access resources, comprising:

performing state verification on a plurality of operation dimensions involved in generating a scheduling scheme, including:

verifying a timeliness of basic data of each of the operation dimensions, and determining, in response to the timeliness of the basic data of one of the operation dimensions exceeding a corresponding failure threshold, the one of the operation dimensions to be abnormal; and verifying whether an output scheduling scheme from each of the operation dimensions after operation is abnormal, including, for each of the operation dimensions:

comparing the output scheduling scheme of the operation dimension with an input scheduling scheme of the operation dimension; and in response to a change of the output scheduling scheme relative to the input scheduling scheme exceeding an abnormality threshold, determining that the operation dimension is abnormal; and in response to one or more of the operation dimensions being abnormal, removing one or more abnormal operation dimensions to generate a new scheduling scheme:

wherein the basic data involved in each of the operation dimensions is derived from an operation and maintenance configuration, a database of a monitoring system, a big data platform, a configuration management system, or a big data system.

2. The method for configuring the scheduling scheme of access resources according to claim 1, further comprising: configuring a plurality of operation modes having different operation dimension configurations, the plurality of operation modes including a standard operation mode including all of available operation dimensions and one or more degraded operation modes each including some but not all of the available operation dimensions.

3. The method for configuring the scheduling scheme of access resources according to claim 2, wherein removing the one or more abnormal operation dimensions to generate the new scheduling scheme includes removing the one or more abnormal operation dimensions from the standard operation mode to obtain a new operation mode.

4. The method for configuring the scheduling scheme of access resources according to claim 2, wherein removing the one or more abnormal operation dimensions to generate the new scheduling scheme includes selecting one of the one or more degraded operation modes that does not include the one or more abnormal operation dimensions for calculating the new scheduling scheme.

5. The method for configuring the scheduling scheme of access resources according to claim 4, wherein:
the one or more degraded operation modes include a plurality of degraded operation modes having different weight values; and
selecting the one of the one or more degraded operation modes that does not include the one or more abnormal operation dimensions for calculating the new scheduling scheme includes:
determining, from the plurality of degraded operation modes, one or more candidate degraded operation modes that do not include the one or more abnormal operation dimensions; and
selecting one of the one or more candidate degraded operation modes that has a highest weight value among the one or more candidate degraded operation modes for calculating the new scheduling scheme.

6. The method for configuring the scheduling scheme of access resources according to claim 2, wherein, for each of the operation modes:
the operation dimensions in the operation mode are sorted in a certain order;
an initial scheduling scheme is used as an input of the operation dimension at a first place in the certain order, an output of an immediately preceding operation dimension in the certain order is used as an input of a current operation dimension, and an output of the current operation dimension is used as an input of an immediately succeeding operation dimension in the certain order; and
a data format of an input scheduling scheme of one of the operation dimensions is consistent with a data format of an output scheduling scheme of the one of the operation dimensions.

7. The method for configuring the scheduling scheme of access resources according to claim 6, wherein, after an abnormal operation dimension is determined, the input scheduling scheme of the abnormal operation dimension is directly transparently transmitted to an immediately succeeding operation dimension in the certain order, as the input scheduling scheme of the immediately succeeding operation dimension.

8. The method for configuring the scheduling scheme of access resources according to claim 6, further comprising, when a currently used operation mode is one of the one or more degraded operation modes:
performing state verification on each operation dimension in the standard operation mode; and
switching back to the standard operation mode in response to determining that each operation dimension in the standard operation mode is normal.

9. An apparatus for configuring a scheduling scheme of access resources, comprising:
a memory storing a computer program; and
a processor configured to execute the computer program to:
perform state verification on a plurality of operation dimensions involved in generating a scheduling scheme, including:
verifying a timeliness of basic data of each of the operation dimensions, and determining, in response to the timeliness of the basic data of one of the operation dimension exceeding a corresponding failure threshold, one of the operation dimension to be abnormal; and
verifying whether an output scheduling scheme from each of the operation dimensions is abnormal by:
comparing the output scheduling scheme of the operation dimension with an input scheduling scheme of the operation dimension; and
in response to a change of the output scheduling scheme relative to the input scheduling scheme exceeding an abnormality threshold, determining that the operation dimension is abnormal; and
in response to one or more of the operation dimensions being abnormal, remove one or more abnormal operation dimensions to generate a new scheduling scheme:
wherein the basic data involved in each of the operation dimensions is derived from an operation and maintenance configuration, a database of a monitoring system, a big data platform, a configuration management system, or a big data system.

10. The apparatus for configuring the scheduling scheme of access resources according to claim 9, wherein the processor is further configured to execute the computer program to configure a plurality of operation modes having different operation dimension configurations, the plurality of operation modes including a standard operation mode including all of available operation dimensions and one or more degraded operation modes each including some but not all of the available operation dimensions.

11. The apparatus for configuring the scheduling scheme of access resources according to claim 10, wherein the processor is further configured to execute the computer program to:
remove the one or more abnormal operation dimensions from the standard operation mode to obtain a new operation mode; or
select one of the one or more degraded operation modes that does not include the one or more abnormal operation dimensions for calculating the new scheduling scheme.

12. The apparatus for configuring the scheduling scheme of access resources according to claim 11, wherein:
the one or more degraded operation modes include a plurality of degraded operation modes having different weight values; and
the processor is further configured to execute the computer program to:

determine, from the plurality of degraded operation modes, one or more candidate degraded operation modes that do not include the one or more abnormal operation dimensions; and select one of the one or more candidate degraded operation modes that has a highest weight value among the one or more candidate degraded operation modes for calculating the new scheduling scheme.

13. The apparatus for configuring the scheduling scheme of access resources according to claim 10, wherein, for each of the operation modes:

the operation dimensions in the operation mode are sorted in a certain order;

an initial scheduling scheme is used as an input of the operation dimension at a first place in the certain order, an output of an immediately preceding operation dimension in the certain order is used as an input of a current operation dimension, and an output of the current operation dimension is used as an input of an immediately succeeding operation dimension in the certain order; and a data format of an input scheduling scheme of one of the operation dimensions is consistent with a data format of an output scheduling scheme of the one of the operation dimensions.

14. The apparatus for configuring the scheduling scheme of access resources according to claim 10, wherein, for each of the operation modes:

the operation dimensions in the operation mode are sorted in a certain order;

an initial scheduling scheme is used as an input of the operation dimension at a first place in the certain order, an output of an immediately preceding operation dimension in the certain order is used as an input of a current operation dimension, and an output of the current operation dimension is used as an input of an immediately succeeding operation dimension in the certain order; and a data format of an input scheduling scheme of one of the operation dimensions is consistent with a data format of an output scheduling scheme of the one of the operation dimensions.

15. The apparatus for configuring the scheduling scheme of access resources according to claim 14, wherein the processor is further configured to execute the computer program to, after an abnormal operation dimension is determined, directly transparently transmit the input scheduling scheme of the abnormal operation dimension to an immediately succeeding operation dimension in the certain order, as the input scheduling scheme of the immediately succeeding operation dimension.

16. The apparatus for configuring the scheduling scheme of access resources according to claim 14, wherein the processor is further configured to execute the computer program to, when a currently used operation mode is one of the one or more degraded operation modes:

perform state verification on each operation dimension in the standard operation mode; and switch back to the standard operation mode in response to determining that each operation dimension in the standard operation mode is normal.

17. A non-transitory computer readable storage medium storing computer programs for configuring a scheduling scheme of access resources, the computer programs, when executed by a processor, cause the processor to:

perform state verification on a plurality of operation dimensions involved in generating a scheduling scheme, including:

verifying a timeliness of basic data of each of the operation dimensions, and determining, in response to the timeliness of the basic data of one of the operation dimension exceeding a corresponding failure threshold, the one of the operation dimension to be abnormal; and verifying whether an output scheduling scheme from each of the operation dimensions after operation is abnormal, including, for each of the operation dimensions:

comparing the output scheduling scheme of the operation dimension with an input scheduling scheme of the operation dimension; and in response to a change of the output scheduling scheme relative to the input scheduling scheme exceeding an abnormality threshold, determining that the operation dimension is abnormal; and in response to one or more of the operation dimensions being abnormal, remove one or more abnormal operation dimensions to generate a new scheduling scheme;

wherein the basic data involved in each of the operation dimensions is derived from an operation and maintenance configuration, a database of a monitoring system, a big data platform, a configuration management system, or a big data system.

* * * * *